United States Patent [19]

Norsworthy

[11] 4,143,321

[45] Mar. 6, 1979

[54] APPARATUS AND PROCESS FOR GROUPING PULSE SIGNALS ACCORDING TO SOURCE

[75] Inventor: Keith H. Norsworthy, Bellevue, Wash.

[73] Assignee: The Boeing Co., Seattle, Wash.

[21] Appl. No.: 800,538

[22] Filed: May 25, 1977

[51] Int. Cl.² ............................................. H04B 1/16
[52] U.S. Cl. ..................................... 325/67; 325/304; 325/363; 343/112 R
[58] Field of Search ...................... 325/67, 51, 55, 363, 325/301, 304; 343/112 R, 112 TC, 112 C, 113 R

[56] References Cited

U.S. PATENT DOCUMENTS

| | | | |
|---|---|---|---|
| 3,659,085 | 4/1972 | Potter et al. | 343/112 TC |
| 3,705,404 | 12/1972 | Chisholm | 343/112 TC |
| 3,714,573 | 1/1973 | Grossman | 325/55 |
| 3,848,254 | 11/1974 | Drebinger | 343/112 R |
| 3,881,154 | 4/1975 | Lewis et al. | 325/67 |
| 3,940,700 | 2/1976 | Fischer | 325/67 |

*Primary Examiner*—Robert L. Griffin
*Assistant Examiner*—Tommy P. Chin
*Attorney, Agent, or Firm*—Cole, Jensen & Puntigam

[57] ABSTRACT

Signals in the form of pulses generated by a plurality of signal sources are received at two spaced receivers, and following initial filtering (if any), are stored, in chronological order of receipt, in memories associated with each receiver. Each pulse so stored has associated therewith time data which is the time of its arrival at the receiver. The difference between the time data of the first pulse stored in the first memory and the time data of each, or selected ones, of the pulses in turn in the second memory is determined, and then compared with a preselected range of time data. A preselected numerical quantity is then added to a specific address location in an accumulator whenever the time difference satisfies the preselected range. Each satisfactory time difference has a unique address location in the accumulator. The above steps are then repeated for each singal in the first memory. An accumulated total numerical quantity is thus present in the accumulator for each satisfactory time difference following conclusion of the above steps. The above process steps are then repeated, except that instead of adding a numerical quantity of the accumulator each time a successful time difference is determined, the accumulator is interrogated to determine whether that particular address location has accumulated a total numerical quantity which is above a preset threshold level. If so, the two pulses from the memories being compared at that point are read out of the memories into a follow-on storage device, where they are further stored in order of time difference.

12 Claims, 2 Drawing Figures

APPARATUS AND PROCESS FOR GROUPING PULSE SIGNALS ACCORDING TO SOURCE

BACKGROUND OF THE INVENTION

The present invention relates generally to the art of signal processors, and more specifically concerns a system for sorting, according to source, pulsed signals originated by a plurality of sources and received at two or more physically separated receivers.

Among other advantages, signals which have been sorted according to source may be further processed to provide information as to the physical location of the sources.

In a particular application, the physical area of interest may include several thousand emitters having various carrier pulse repetition frequencies. Initially known filtering techniques are frequently used in the art to reduce the number of signals to be processed to a particular frequency range. These techniques include bandpass filtering, centered around a selected carrier and/or pulse repetition frequency, and spatial angle of arrival filtering. These filtering techniques reduce the total number of received signals to a more manageable level, and limit further signal processing to only those signals of interest, but do not accomplish signal sorting according to source.

The prior art source-sorting techniques can be generally divided into two basic categories; real time and non-real time. Non-real time processing, which is usually accomplished with a computer, is advantageous in those instances where there is sufficient time between the receipt of the signals and the time at which the resulting information is required to accomplish the required computer processing routines. However, all non-real time processors have the significant disadvantage of being too slow when the sorting information is required real-time. In such instances, the sorting information provided by non-real time processors is often useless by the time it is ready, because changing circumstances have made it out-of-date.

Hence, real time processing is necessary in many applications. Existing real time processors for sorting received signals according to source, however, require complex and expensive hardware. In addition, the processing routines tend to be lengthy and complicated to achieve accurate results. The time resolution of the processing computations is thus made relatively low and the results are consequently often inaccurate and/or unreliable. Hence, real-time processors are infrequently used.

Accordingly, it is an object of the present invention to provide an apparatus and a process which eliminates one or more of the problems of the prior art discussed above.

It is another object of the present invention to provide such an apparatus/process which is capable of accurately sorting, in real time, signals received by two or more spaced receivers according to source.

It is a further object of the present invention to provide such an apparatus/process which is capable of sorting received signals according to source using only time of arrival data.

It is an additional object of the present invention to provide such an apparatus/process which provides accurate results due to the high time resolution of its computations.

It is an additional object of the present invention to provide such an apparatus/process which is capable of modifying its sorting techniques in accordance with additional information concerning the received signals.

It is a still further object of the present invention to reduce the complexity and expense of existing real-time signal sorting systems.

DESCRIPTION OF THE DRAWINGS

A more thorough understanding of the invention may be obtained by a study of the following detailed description taken in connection with the accompanying drawings in which.

SUMMARY OF THE INVENTION

The present invention is an apparatus for grouping pulses produced by a plurality of sources according to source in real time. The apparatus is primarily useful in a system environment which includes first and second spaced receivers, wherein the receivers include timers for establishing the time at which the pulses are received. In the environment, each pulse produced by each source is received at different times by the two receivers, since they are physically separated. From the receivers, the pulses and their associated time data are applied to a memory which stores the pulse and time data information is chronological order according to receiver. The time difference between the time data for selected pulses from the first receiver and the time data for selected pulses from the second receiver in turn is then determined. Each time difference so determined is compared with a preset range of time differences. An accumulator having a plurality of address locations which correspond to those time differences satisfying the preset range is incremented by a known numerical quantity at the correct address each time a time difference satisfies the preset range. At the conclusion of the above-described process routines accomplished by the apparatus, a total numerical quantity will be present in those locations in the accumulator corresponding to a time difference satisfying the preset range. The total numerical quantities are then compared with a threshold quantity and in those cases where the total numerical quantity exceeds the threshold, each pair of pulses which have that time difference are then routed to a storage device, in which the pulse pairs are then further grouped according to time difference.

DESCRIPTION OF THE PREFERRED EMBODIMENT

Figure 1:
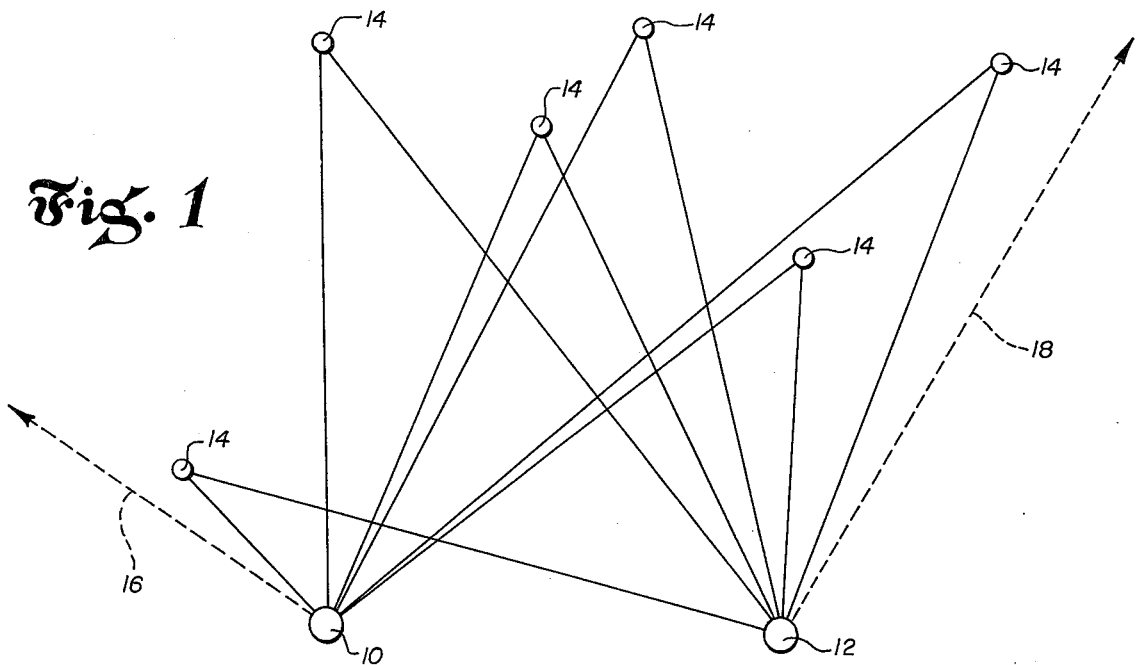
FIG. 1 is a diagram showing a multiple signal source, two-receiver system for illustration of the operation of the present invention.

Referring to FIG. 1, an illustrative multiple signal source, two-receiver system environment in which the signal sorting system of the present invention is useful is shown. The system environment includes (1) two receivers 10 and 12 which are physically separated from each other and which may or may not be in motion, and (2) a plurality of signal sources 14—14 which are located in a predetermined physical area of interest defined by border lines 16 and 18. In the environment of FIG. 1, the area of interest may cover many square miles and receivers 10 and 12 may be separated by a considerable distance.

The system environment of FIG. 1 includes two receivers and six signal sources. It should be understood, however, that the signal sorting system of the present invention is adapted to be useful in environments comprising a substantially higher number of signal sources and more than two receivers.

The signals emitted by sources 14—14 must be in the form of pulses for proper operation of the present invention. The pulses may be modulated on a carrier signal having a significantly higher frequency than the pulse repetition frequency. Typical examples of carrier and pulse repetition frequencies are 500 megahertz and 10 megahertz, respectively.

Signal sources 14—14 usually will not be synchronized and the carrier and pulse repetition frequencies will typically be different from each source. In addition, both the carrier and pulse repetition frequencies of sources 14—14 may drift or vary slightly. In such a case, signal sources 14—14 will be independent, in a signal sense, from each other, and the time relationship between the signals emitted by the different sources will hence be random, resulting in a series of randomly-spaced pulse signals arriving at each receiver 10 and 12. The single exception to the random time relationship between the different signals is the constant time difference between the arrival of a given single pulse originated from any one of the sources 14—14 at the two receivers. This time difference will not vary for each pair of received signals originated as a single pulse from a given source unless the geometric distances change between the source and the receivers.

Figure 2:
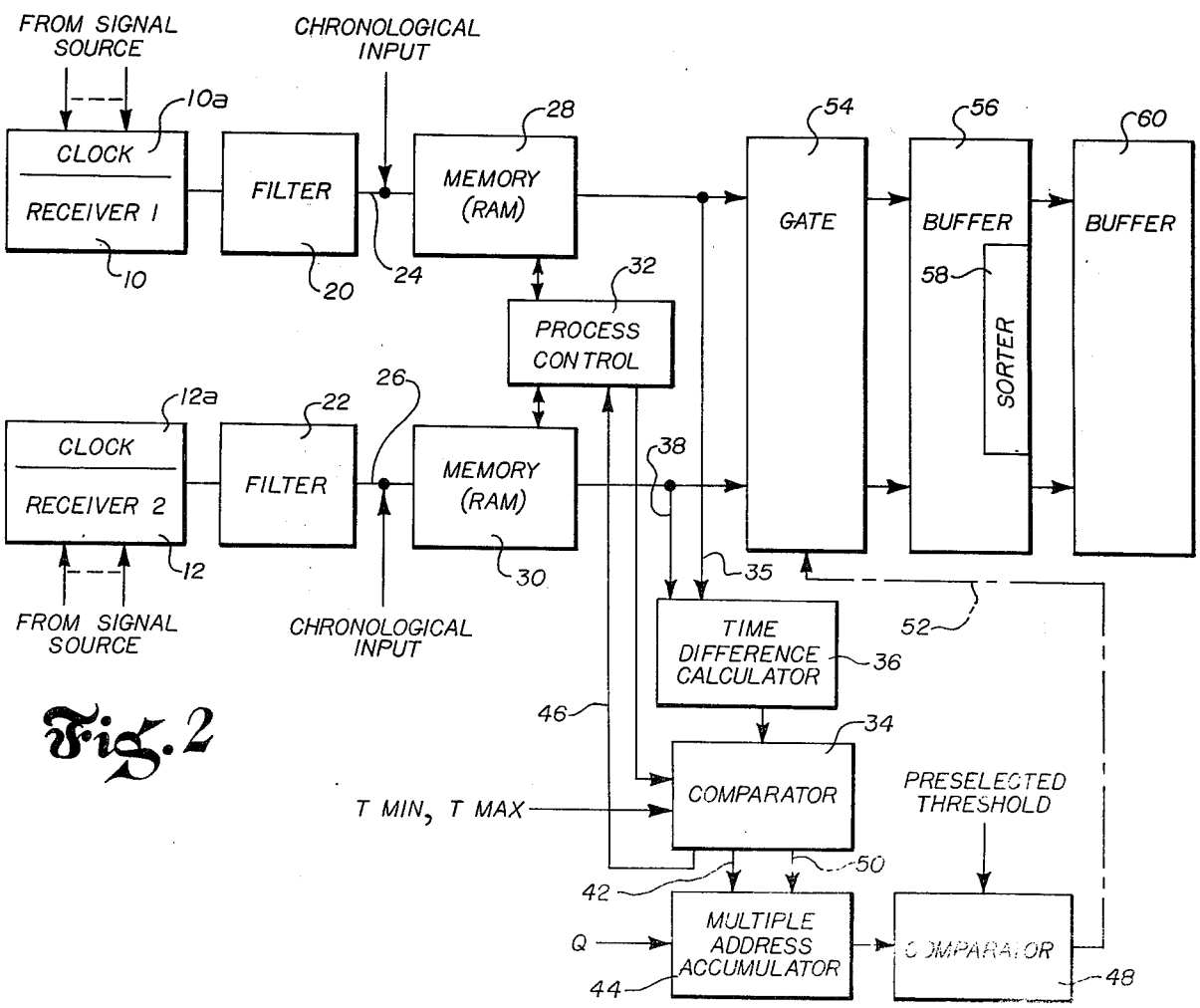
FIG. 2 is a block diagram showing the structure of the present invention.

Referring now to FIG. 2, the pulses produced by each signal source 14 arrive at receivers 10 and 12. A single pulse from any one of sources 14—14 will result in a pulse being detected at both receivers 10 and 12. The detection of the pulse at one receiver will be different in time from the detection of the same pulse at the other receiver, and hence, the detections have a specified time difference which is determined by the relative geometry of the particular signal source and receivers 10 and 12.

A clock 10a, 12a in each receiver records the time when each pulse is received. Other circuitry (not shown) in receivers 10 and 12 may be used to detect other descriptive information about each pulse, such as its amplitude, its rise time, and/or its time duration. This information is referred to hereinafter as pulse descriptor data, and in combination with the time of arrival data, hereinafter referred to as time data, established by clocks 10a, 12b, form signal detection data for each received pulse. This signal detection data, along with the actual pulses, are then applied, in chronological order of receipt and in real time, to the filter section of the processor.

Filter circuits 20 and 22 are conventional circuits which significantly reduce the number of pulses and their associated signal detection data to be sorted according to source. Circuits 20 and 22 may, for instance, include a band-pass filter centered on either a selected range of carrier frequencies or a selected range of pulse repetition frequencies. Other filtering circuits may be used which limit the pulses which are to be further processed to those within a selected range of spatial angle of arrival. Combinations of the above filter circuits may also be conveniently used.

In a typical circumstance, filter circuits 20, 22 may reduce the number of individual signal sources to be investigated from as high as 10,000 to a range of 20-100, which number is suitable for the processing apparatus of the present invention.

Those pulses and their associated signal detection data which are not eliminated by the filtering circuits are still in chronological order of receipt and are applied on lines 24 and 26, respectively, to memories 28 and 30, where they are stored in chronological order.

Memories 28 and 30 each comprise a conventional random access memory (RAM). Only those pulses and their associated signal detection data which reach memories 28 and 30 during a pre-selected interval of time are stored. The time interval will vary depending upon the application, but typically will range from 1/10th second to 1/100th second. The time interval usually is sufficient to permit a substantial number of pulses and signal detection data to be stored in memories 28 and 30. A quiet environment, however, will permit good results with relatively few pulses stored.

Typically, around 20 pulses from a given source 14 in a normal environment will be sufficient to provide good results. The actual storage of the pulses and their associated signal detection data in memories 28 and 30 over the specified time interval is controlled by a conventional process control circuit 32 which operates in a conventional manner to control the operation and timing of memories 28 and 30, as well as the other elements in the system of the present invention.

Upon chronological storage in memories 28 and 30 of a series of pulses and associated signal detection data over the selected time interval, the sorting process begins, in which the pulses are eventually sorted according to source by comparison of the times of arrival of the pulses at receivers 10 and 12.

A preselected range of time values, between Tmin and Tmax, is initially established in the processing apparatus. The selected values of Tmin and Tmax must be such that the minimum and maximum time differences of arrival for pulses originated by a single signal source within the area of interest are included. The values of Tmin and Tmax will be determined primarily by the distance between receivers 10 and 12, and the configuration of the general area of interest, i.e., the area bounded by lines 16 and 18 in FIG. 1.

Although the values of Tmin and Tmax can be either positive or negative, they are assumed to be positive for purposes of explanation in the following paragraphs. Although actual values of Tmin and Tmax will vary widely, depending upon the particular application, representative values include a Tmin of 1/10 millisecond and a Tmax of 1 millisecond. The values of Tmin and Tmax are established in comparator 34. The operation of comparator 34, and the operating significance of Tmin and Tmax, will be clarified in the following paragraphs.

In the first step of processing the data stored in memories 28 and 30, the time data for the first signal in one of the memories, i.e., memory 28, is read out of memory 28 and over line 35 into one input of a conventional time difference calculator 36. The time data for the first signal stored in the other memory, i.e., memory 30, is concurrently read out of memory 30 and over line 38 into the other input of time difference calculator 36.

Time difference calculator 36, which is of known construction and design, then determines the time difference between the time data inputs on lines 35 and 38. The time difference so determined is then applied to comparator 34, which, in a first mode under the control of process control circuit 32, determines whether the time difference from calculator 36 is within the range established by Tmin and Tmax. If the time difference satisfies the established range when comparator 34 is in its first operating mode, an output is produced by comparator 34 on line 42 and applied as an input to the multiple address accumulator 44. If not, the time difference data is discarded.

The presence of an output signal on line 42, which is indicative of the time difference produced by calculator 36, results in a pre-established numerical quantity Q being added to a location in the accumulator 44 having an address which corresponds to the time difference.

Accumulator 44 is also of conventional design and construction, and is well known per se. The quantity Q may be a fixed numerical value, typically unity, or it may be variable. When quantity Q is variable, its value for a particular operation depends upon the degree of equality existing between one or more selected signal descriptors (i.e., amplitude, rise time, etc.) of the two pulses being compared. When a variable Q is desired, additional circuitry, such as comparators, etc., not shown in FIG. 2 is required.

Whe comparator 34 is operating in its first mode, the output on line 42 energizes multiple address accumulator 44 to receive and store data only; accumulator 44 has no output. The result of an output from comparator 34 during the first round of processing, i.e., when comparator 34 is operating in its first mode, is the entry of a quantity Q in a location in accumulator 44 having an address corresponding to the actual time difference between the pulses from each memory being processed by calculator 36.

This above processing steps are then repeated for each pulse stored in memories 28 and 30. More specifically, the time data for each pulse in memory 30 is processed in turn relative to the time data for the first stored pulse in memory 28. The comparison of the time data for each signal in memory 30 with the time data for the first signal in memory 28 terminates, however, when the value of Tmax is initially exceeded. Since the pulses and associated signal detection data are stored in chronological order, once a comparison between a particular signal in memory 30 with the signal in memory 28 results in a time difference which is greater than Tmax, it is certain that all remaining comparisons will also result in time differences which exceed Tmax as well. The comparison process is terminated by process control circuit 32 which is responsive to output information from comparator 34 over line 46.

After the first part of the first round of processing has been completed as described above for the time data for all the pulses in memory 30 relative to the time data for the first pulse in memory 28, the remaining portion of the first round of processing in which the time data for each pulse in memory 30 is compared with the time data for the second and following pulses in memory 28 in turn, is completed.

The comparison process for the time value for the second pulse in memory 28 is abbreviated with respect to both the beginning and termination points of the pulses processed from memory 30. The first time data processed from memory 30 is the first to be equal to or greater than the value of Tmin. The last time data processed is the one which first exceeds Tmax. Such processing control techniques permit a complete round of comparisons in a minimum time. The first round of processing continues until the time data for each relevant pulse in memory 30 has been processed relative to the time data for each pulse, or selected ones, in memory 28.

At this point, there is a total numerical quantity in those locations in accumulator 44 having addresses which correspond to time differences which satisfied the range test carried out by comparator 34. The total numerical quantity for some locations in accumulator 44 will be quite large compared to other locations and the actual time difference represented by the address of those locations corresponds to a "valid" pair of pulses, i.e., a valid pair of pulses is the result of a single emission from a particular signal source. The large numerical total at those locations is attributable to the fact that quantity Q is added at the appropriate location in accumulator 44 each time an emission occurs from a particular source.

Other actual time differences satisfying the range requirements may occur randomly, due to the variance in frequency and relative timing of all sources 14—14. The total numerical quantities stored at the locations in accumulator 44 having addresses corresponding to those time differences will, however, be relatively low, as their occurrence is random, and not regularly repeated. The degree of randomness depend upon the differences, if any, in frequency between the signal sources within the area of interest, the relative timing of their emissions, and the distance from each source to the receivers 10 and 12.

In the next round of processing, comparator 48 comes into operation, as does gate 54, buffers 56 and 60, and sorter 58. Comparator 34 operates in a second mode. A preselected numerical threshold is established in comparator 48, the significance of which will be clarified hereinafter. In the second round of processing, the steps of the first round of processing are repeated, i.e., the time data for each selected pulse in memory 28 is processed in turn with respect to the time data for each, or selected ones, of the pulses in memory 30 by time difference calculator 36 and comparator 34.

Instead of adding an additional quantity Q to the corresponding time difference address in accumulator 44 each time a time difference satisfies the Tmin-Tmax range test, however, as was done in the first round of processing, comparator 34 produces an output on line 50 which causes the actual time difference value and the total numerical quantity accumulated at the location in accumulator 44 having an address which corresponds to the time difference to be read out of accumulator 44 into comparator 48. The total numerical quantity so read into comparator 48 is then compared with the numerical threshold previously established therein.

The numerical threshold value is sufficiently high to be substantially above the totals accumulated randomly in accumulator 44 but not so high as to be above the total accumulated for the time difference of valid pairs of pulses.

When the total numerical quantity applied to comparator 48 from accumulator 44 is less than the threshold value, comparator 48 will produce no output, and gate 54, which has inputs from memories 28 and 30 remains open, meaning that it is acting as an open circuit. Hence, while the time data of two particular pulses from memories 28 and 30 is being processed by calculator 36, comparator 34, accumulator 44, and comparator 48, the complete signal detection data, which includes the time data, the pulses and the descriptor data, if any, which are available at the inputs of gate 54, are precluded from proceeding beyond that point.

When the total numerical value in a particular time difference location in accumulator 44 is greater than the threshold value established in comparator 48, however, an output is produced by comparator 48 to close gate 54, which completes the circuit between gate 54 and first buffer 56, permitting the signal detection data available at the inputs of gate 54 to be applied from memories 28 and 30 into first buffer 56.

This process continues until all relevant pulses in memory 30 have again been processed with respect to the selected pulses in memory 28 and results in each valid pair of pulses and their associated time data (descriptor data as well, if any) being stored in buffer 56.

Most invalid (random) pulse pairs are eliminated after the first and second rounds of processing described above, but the valid pulse pairs are grouped according to source in buffer 56. In order to group all valid pulse pairs together according to source, i.e. wherein all pulse pairs having the same time difference are grouped together, a sorter 58 and a second buffer 60 is provided. Sorter 58 operates in conventional fashion, and may be implemented completely by hardware, as with a series of comparators, or with the aid of a computer program, to search the time difference values for each pair of valid pulses in buffer 56 to find the minimum time difference.

After the minimum time difference has been determined by sorter 58, each pulse pair having the minimum time difference is then transferred from buffer 56 into buffer 60. At the completion of this processing step, all of the valid signal pairs having the minimum time difference are grouped together in buffer 60. Sorter 58 then repeats the above process for the next lowest time difference, and transfers all of the valid pulse pairs having that time difference in a group to buffer 60. These steps are repeated until all of the pulse pairs originally in buffer 56 have been transferred into buffer 60. The pulse pairs in buffer 60 are now grouped according to source, and the processing is complete.

Thus, a system has been described which in operation sorts the signals received at a pair of physically separated receivers first into valid signal pairs, and invalid pairs, and discards the invalid pairs while storing the valid pairs. The valid pairs are now grouped together on the basis of time difference, resulting in a grouping by source. The high time resolution of the above-described system results in an accurate sorting according to source of received pulse signals in real time.

Although the preferred embodiment of the invention has been disclosed for purposes of illustration, it should be understood that various changes, modifications and substitutions may be incorporated in such embodiment without departing from the spirit of the invention as defined by the claims which follow. For instance, comparator 48 may be eliminated in some instances, such as when the selected threshold is established in accumulator 44 itself, and the accumulator is adapted to produce an output when the total in any one location reaches a preset quantity when the accumulator is counted up from zero, or reaches zero when the accumulator is counted down from a selected quantity previously established.

What is claimed is:

1. Apparatus for grouping pulses, which are produced by a plurality of sources, according to source in real time, said apparatus being useful in a system environment which includes first and second spaced receivers, wherein each pulse produced by each source arrives at said first and second receivers at different times, and wherein said first and second receivers each include means for establishing the time at which each pulse arrives, said apparatus comprising:
   memory means for storing the established time of arrival data for each pulse which arrives at the first and second receivers over a selected interval of time;
   means determining the time difference between the time of arrival data for selected pulses from the first receiver and the time of arrival data for selected pulses from the second receiver in succession;
   first comparing means comparing each said determined time difference with a preset range of time differences;
   means accumulating a known numerical quantity each time a particular time difference satisfies the preset range, in a location corresponding to said particular time difference, resulting in an accumulated total quantity for each time difference in the preset range following the completion of the determining, comparing and accumulating functions for the pulses stored in said memory means over the selected interval of time;
   second comparing means comparing each total accumulated quantity with a pre-established threshold quantity;
   means responsive to said second comparing means for routing to a first storage means each pair of pulses from the first and second receivers for which a time difference has been determined for which in turn a total quantity has been accumulated which satisfies the threshold quantity; and
   means grouping all pairs of pulses in said first storage means according to their respective time differences.

2. An apparatus of claim 1, wherein said routing means includes a gate, under the control of said second comparing means, and further includes means connecting said memory means to said gate, such that, in operation, a particular pulse from the first receiver and a particular pulse from the second receiver are available to be applied to said gate if the time difference between them has an accumulated total quantity which satisfies the threshold quantity.

3. An apparatus of claim 2, including means for sequencing the operation of said determining means, said first and second comparing means, and said accumulator means such that all selected pulses from the second receiver are processed first with the first pulse from the first receiver and then with each of the remaining pulses from the first receiver in succession.

4. An apparatus of claim 3, wherein the pulses from the first and second receivers are stored in said memory means and processed in chronological order of receipt, and wherein said apparatus include means for terminating the determination of time difference between one selected pulse from the first receiver and selected pulses from the second receiver when the time difference in any one comparison first exceeds the maximum of the preset range of time differencies.

5. An apparatus of claim 4, wherein said grouping means includes second storage means and a sorter means, wherein said pulse pairs stored in said first storage means are searched by said sorter means to determine the smallest time difference among the pulse pairs, said sorter means further including means applying each pair of pulses having the smallest time difference to said second buffer storage means, said sorting means in operation repeating said searching and applying steps until all of the signals in the first buffer storage have been transferred to said second buffer storage means.

6. An apparatus of claim 5, wherein said preset range of time differences is dependent upon the geometry of the area of interest in which said sources are located, and the distance separating the first and second receivers.

7. A process of grouping pulses, which are produced by a plurality of sources, according to source in real time, said apparatus being useful in a system environment which includes first and second spaced receivers, wherein each pulse produced by each source arrives at said first and second receivers at different times, said process comprising the steps of:

establishing the time of arrival of each pulse at the first and second receivers;

determining the time difference between the time of arrival for selected pulses from the first receiver and the time of arrival for selected pulses from the second receiver in succession;

comparing each time difference so determined with a preset range of time differences;

accumulating, for each time difference satisfying the preset range, a known numerical quantity each time a time difference satisfies the preset range, resulting in an accumulated total quantity for each time difference satisfying the preset range following completion of the steps of determining, comparing and accumulating;

comparing each total numerical quantity with a pre-established threshold quantity;

routing to a first storage each pair of pulses from the first and second receivers for which a time difference has been determined which in turn has an accumulated total quantity which exceeds the threshold quantity; and grouping the paired pulses in the storage means according to their respective time differences.

8. A process of claim 7, wherein the step of determining, the first step of comparing and the step of accumulating are accomplished for a first pulse from the first receiver and the selected pulses from said second receiver in succession, and then repeated for each selected pulse in turn from the first receiver.

9. A process of claim 8, wherein the second step of comparing is initiated after the step of determining, the first step of comparing and the step of accumulating are accomplished for all of the selected pulses from the first and second receivers.

10. A process of claim 9, including the steps of terminating the first step of comparing and the step of accumulating for a pulse from the first receiver when the time difference determined by the first step of comparing is greater than the maximum of the preset range of time differences.

11. A process of claim 7, wherein the preset numerical quantity is variable, its value depending upon the degree of match between selected characteristics of the two pulses being compared.

12. The process of claim 11, wherein the preset range of time differences is dependent upon the geometry of the area of interest in which the sources are located, and the distance separating the first and second receivers.

* * * * *